United States Patent [19]

O'Keefe et al.

[11] 4,144,804
[45] Mar. 20, 1979

[54] APPARATUS FOR CONTINUOUSLY CONTROLLING BUTTERFAT CONTENT OF RECONSTITUTED MILK

[75] Inventors: Michael G. O'Keefe, Hopewell Junction; Richard Oberrieth, Beacon, both of N.Y.

[73] Assignee: On-Line Instrumentation, Inc., Hopewell Junction, N.Y.

[21] Appl. No.: 731,467

[22] Filed: Oct. 12, 1976

[51] Int. Cl.² .................. A23C 9/00; G01N 33/06; G05D 11/02

[52] U.S. Cl. .......................................... 99/452; 137/3; 137/93; 137/110; 364/109; 426/231; 426/491; 422/74

[58] Field of Search ............... 23/230 A, 231, 253 A, 23/258; 426/231, 491; 99/452; 137/3, 93; 235/151.12 MO; 364/109

[56] References Cited

U.S. PATENT DOCUMENTS

| | | | |
|---|---|---|---|
| 3,442,623 | 5/1969 | Aegiduis | 23/231 |
| 3,605,775 | 9/1971 | Zoander et al. | 137/93 X |
| 3,828,172 | 8/1974 | Schickler | 23/253 AX |
| 3,829,584 | 8/1974 | Seiberling | 426/231 |
| 3,961,570 | 6/1976 | Sanden | 99/452 |
| 3,983,257 | 9/1976 | Malmberg et al. | 426/491 X |
| 4,017,643 | 4/1977 | Lester | 426/231 |

Primary Examiner—Joseph Scovronek
Attorney, Agent, or Firm—Edward F. Levy

[57] ABSTRACT

In a milk processing system wherein heat treated milk is initially separated into high-fat and low-fat milk and subsequently reconstituted by adding a selected proportion of high-fat milk to the low-fat milk, control means are provided for automatically controlling the proportion of high-fat milk mixed with the low-fat milk to provide a milk blend of standardized butterfat content which is then homogenized. The control means includes a photoelectric monitoring system for continuously measuring the butterfat content of a sample of the homogenized milk as the latter flows continuously through the processing system under pressure of the homogenizer in the system. The butterfat content measurement is converted to digital signals which are compared to a pre-set digital signal corresponding to a desired butterfat content level to produce a digital corrective signal which controls a digital valve regulating the proportion of high-fat milk blended with the low-fat milk in the processing system. Means are also provided for calibrating the control means at selected intervals to adjust the pre-set digital signal therein to correspond precisely to the desired butterfat content level.

10 Claims, 3 Drawing Figures

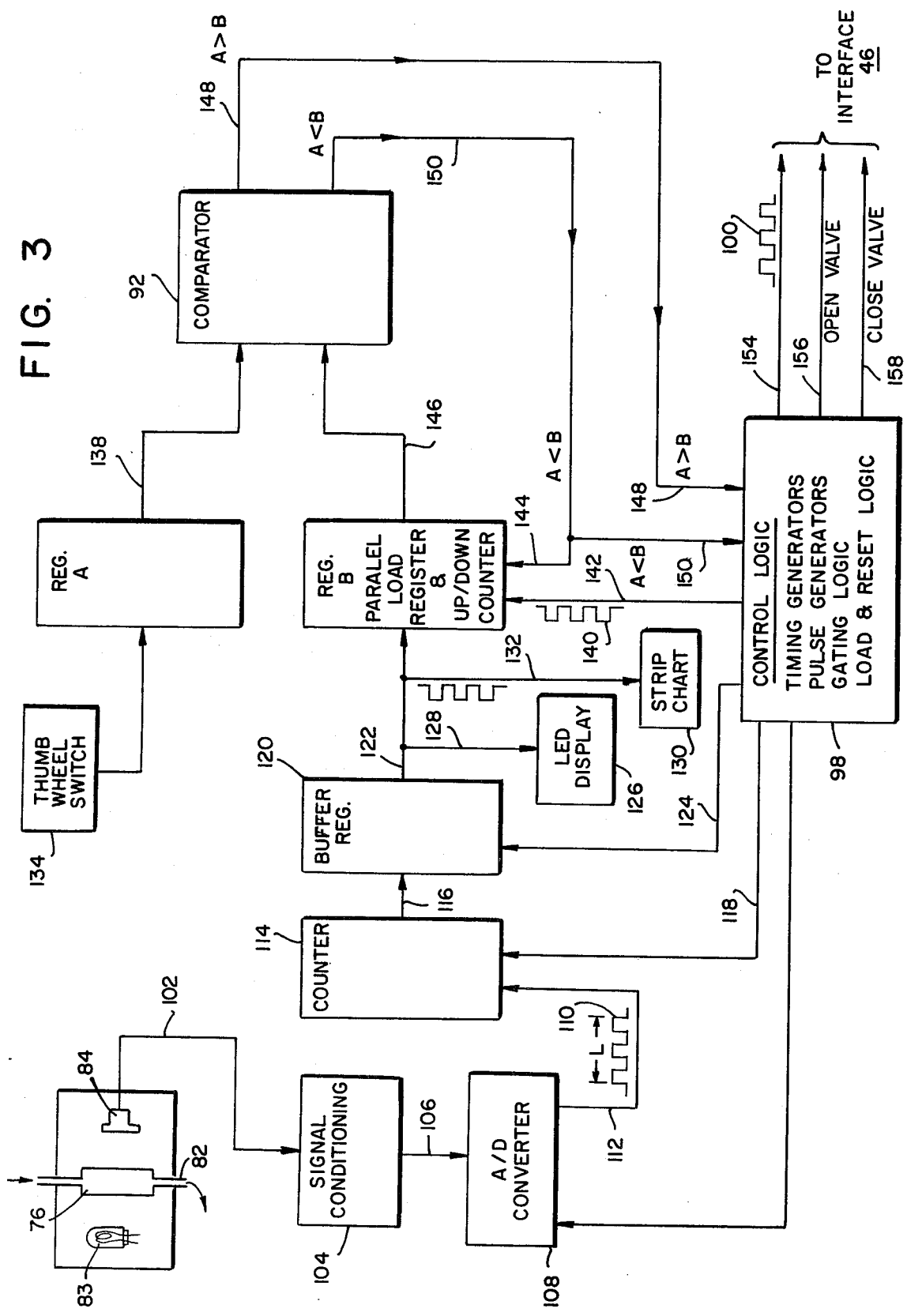

APPARATUS FOR CONTINUOUSLY CONTROLLING BUTTERFAT CONTENT OF RECONSTITUTED MILK

The present invention relates to milk processing systems, and in particular to a novel and improved method and apparatus for the production of standardized homogenized milk.

BACKGROUND OF THE INVENTION

When raw milk is delivered to a processing plant for the manufacture of pasteurized homogenized milk, it contains a large amount of butter fat in the form of cream. The percentage of cream in the raw milk constantly varies in accordance with the season, the particular cows giving the milk, the feed eaten by the cows, and other factors. In the processing plant this raw milk is converted to a standardized commercial blend by first separating out the cream to provide skim milk and pure cream in separate lines, and then reintroducing a selected amount of cream to the skim milk to produce the desired blend which is then homogenized and pasteurized. The excess cream is drawn separately from the system and is bottled and sold as pure cream, a valuable by-product.

Standardized blends of milk vary in the amount of cream (butterfat) contained in the milk. Standardized milk blends are identified by the percentage of butterfat therein, and typical examples are 3.8% milk, 2.0% fortified milk, 1.0% fortified milk and 0.5% milk.

Milk processing plants are ordinarily equipped to deliver finished milk blends at high output speeds and with great efficiency. Most of such plants are required to produce standardized milk of different butterfat percentages at regular intervals, the equipment being adjusted for each production run to produce one grade of milk during one production run and a different grade of milk during a subsequent run. One of the problems in such milk processing operations is the difficulty of obtaining and maintaining the exact required percentage of butterfat in the finished milk. On many occasions, plants produce products below the legal standards for butterfat, and on other occasions produce products with a much higher butterfat content than required, resulting in an uneconomical waste of cream. In plants producing large volumes of milk, the efficiency of processing depends upon the accuracy of the standardization method employed. Such standardization process must be accurate to a high degree of precision and must be capable of adjustment to varying conditions.

A highly efficient and convenient method for determining the absolute fat content in a sample of milk is described in an article entitled "Photometric Milk Fat Determination" by G. Haugaard and J. D. Pettinati appearing at pages 1255–1275 of the *Journal of Dairy Science* of August, 1959. This method is based on the principle of visible light spectrophotometry and utilizes an instrument with a built in homogenizer which homogenizes a milk sample, the sample being then diluted with a chelating agent to remove protein interference and a beam of light is directed through the homogenized mixture. Homogenized fat globules block a portion of the light beam and the remainder is directed to a photoelectric cell which provides an indication on a meter from which the absolute fat content of the sample is derived. A colorimetric testing system of this type is also shown in U.S. Pat. No. 3,442,623 issued May 6, 1969.

The aforementioned colorimetric testing systems were devised as separate systems remote from the milk processing system. In use, samples of the milk blend are withdrawn from the processing system at infrequent intervals, and each sample is subjected to the colorimetric testing to obtain a meter reading from which the actual butterfat content of the sample is calculated. If the percentage of butterfat content is indicated as too high, the processing line is manually adjusted accordingly, to withdraw more cream from the system. On the other hand, if the meter reading indicates that the butterfat content of the sample is too low, the processing line is adjusted to mix more cream with the skim milk.

Attempts have been made to incorporate the aforementioned testing process directly within the processing system to provide an automated control for the blending of cream with the skim milk. In such automated systems, the colorimetric testing unit is calibrated to give an accurate fat reading of the light passing through an intermittently-withdrawn sample, over the scale of the instrument. This information is fed to a controller which in turn supplies air to operate a modulating valve which controls the mixture of high and low fat product. Such automated systems have presented difficulties in operation and maintenance. The colorimetric equipment used in the systems includes a built-in homogenizer which imposes a very high degree of mechanical complexity to the measuring device. In addition, the drawings of milk samples, by means of a pipetting device, is intermittent, resulting in discontinuous flow through the measuring cell, and therefore discontinuous control of the blend of cream and skim milk. Further, the testing devices employed require a tedious and time-consuming calibration procedure to insure that the measuring instrument is properly calibrated over the full scale of the instrument.

SUMMARY OF THE INVENTION

It is an object of the present invention to provide an automated system for monitoring and controlling a continuous sample flow of milk blend in a closed loop milk standardization line including a separator, homogenizer and pasteurizer in the production of homogenized milk, which system is self-calibrating and continuously operative, eliminating the problems of conventional systems heretofore described.

Another object of the invention is the provision of a monitoring and control system of the type described which operates in conjunction with the homogenizer of the milk processing line, thereby eliminating the need for a separate homogenizer in the testing apparatus.

Another object of the present invention is the provision of a monitoring and control system of the character described which contains means for instant pinpoint calibration at selected periodic intervals.

Still another object of the invention is the provision of a monitoring and control system of the character described in which a beam of light is directed through a cuvette or light cell to a photoelectric cell, with a continuous flow of a mixture of milk and diluent being fed through the light cell, thereby eliminating the effect of entrained air.

A further object of the invention is the provision of a monitoring and control system of the character described in which the colorimetric testing apparatus is adapted to send signals in the form of digital code to a digitally-operated modulating valve, thereby eliminating the air operated procedure of conventional systems, and also providing for continuous and uninterrupted control of the cream supply being blended with the milk in the milk processing line.

In accordance with the invention there is provided a monitoring and closed-loop control apparatus for measuring and controlling the butterfat content of reconstituted homogenized milk produced by a milk processing system in which heat treated milk is initially separated into high-fat and low-fat milk with the high-fat milk being fed through a high-fat line and the low-fat milk being fed through a milk line to a junction line at which selected proportions of the high-fat and low-fat milk combine and mix as a reconstituted milk blend which is fed to a homogenizer and then to an outlet line.

The monitoring and control apparatus comprises a digitally-controlled modulator valve located in said high-fat line and operable to selectively restrict and enlarge the valve port thereof to vary the volume of high-fat milk flowing through the high-fat line to the junction line, monitoring means for continuously measuring the butterfat content of a continuously flowing sample of the homogenized milk blend drawn from the outlet line at a point downstream from said homogenizer, and for providing an electrical analog signal corresponding to the measured butterfat content of said sample, and means for converting said analog signal to an equivalent measured butterfat digital signal.

The control apparatus also includes comparator means for comparing the measured butterfat digital signal to a pre-set digital reference signal, and for producing a corrective digital signal corresponding to the difference between said measured butterfat digital signal and said digital reference signal, and a valve interface connected to said comparator means for receiving said corrective signal therefrom, and adapted to open and close the modulator valve by increments corresponding to the corrective digital signal produced by said comparator means.

Means are also provided for feeding a pre-tested sample of homogenized milk having a known butterfat content percentage into the monitoring means, whereby the pre-set digital reference signal in said comparator means may be accurately calibrated.

Additional objects and advantages of the invention will become apparent during the course of the following specification when taken in connection with the accompanying drawings, in which:

BRIEF DESCRIPTION OF THE DRAWINGS

FIG. 3 is a block diagram showing diagrammatically the manner in which the control logic of the monitoring and control system of FIG. 1 regulates the operation of the valve which regulates the supply of high-fat milk being blended with the low-fat milk.

DETAILED DESCRIPTION OF THE PREFERRED EMBODIMENT

Figure 1:
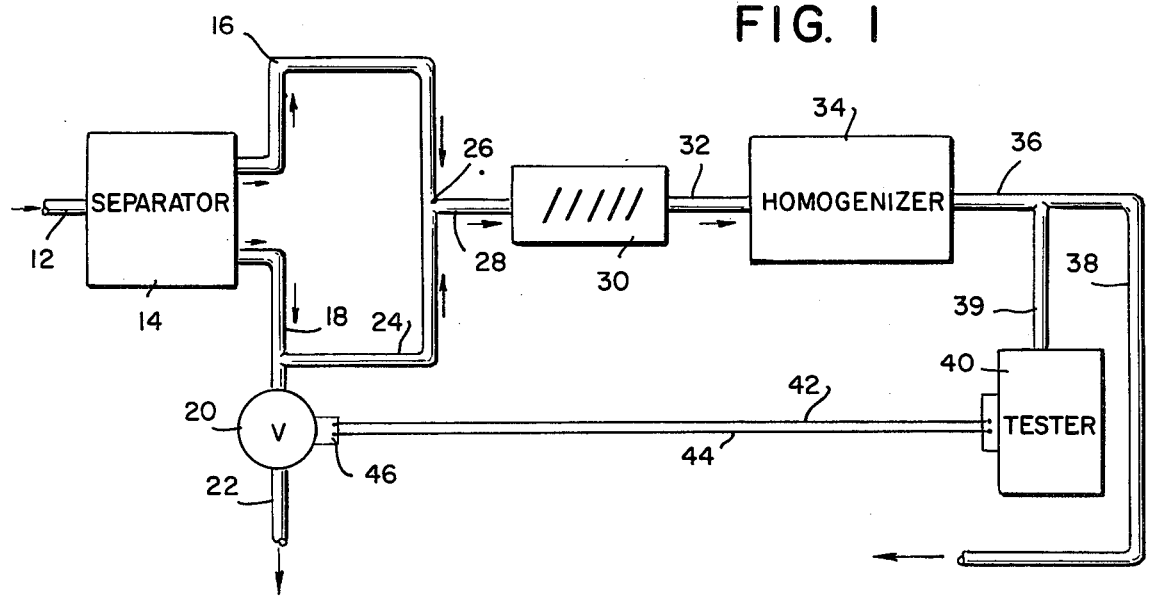
FIG. 1 in a diagrammatic view of a portion of a milk processing and homogenizing system which includes the monitoring and control system of the present invention.

Referring in detail to the drawings, there is shown schematically in FIG. 1 a portion of a milk processing system into which the monitoring and control system of the invention has been incorporated. In this system, raw milk introduced into the system is first passed through a part of a heat exchanger and then processed through a high-temperature, short-time pasteurizer. This initial portion of the system is not shown in the drawing since it is conventional and well-known, and forms no part of the present invention.

Upon leaving the high-temperature, short-time pasteurizer, the milk passes through a pipe 12 to a separator, designated generally by the reference numeral 14, which separates the milk into its basic components, namely low-fat milk and high fat milk. The separator 14 is of conventional type operating by centrifugal action and is not shown in detail herein. All lines to and from the separator are pressure controlled by conventional means which are also not shown.

The low-fat milk discharged by the separator 14 passes through pipe 16 in the direction of the arrows shown in FIG. 1. The high-fat milk discharged by the separator 14 passes through pipe 18 to a communicating pipe 24 for mixing with the low-fat milk flowing through pipe 16. The pipe 18 also communicates with an outlet pipe 22 within which a modulating valve 20 is located. The modulating valve proportions a measured amount of high-fat milk through the outlet pipe 22 out of the processing system and thus directs the remainder of the high-fat milk through the pipe 24 within the processing system in response to the monitoring system described below. The high-fat milk drawn off through outlet pipe 22 is conducted to a reservoir for subsequent bottling as pure cream or for subsequent blending in a separate process.

The valve 20 is a digitally-operated modular valve of conventional and well-known type which contains a digitally controlled stepping motor operable to open or close the valve in precise increments in accordance with digital signals received thereby. The valve 20 is thus operative in response to the digital signals applied thereto by the monitoring system of the present invention to regulate precisely the butterfat content of the homogenized milk produced by the processing system of FIG. 1.

High-fat milk flows through pipe 24 in the direction of the arrows shown in FIG. 1 to a junction point 26, where the high-fat milk combines with milk flowing through pipe 16 in the direction of the arrows shown. The pipes 16 and 24 join and communicate at junction point 26, where they also communicate with a pipe 28 through which the mixture of low-fat milk and high-fat milk flows to a mixing line 30. After the blend of low-fat milk and high-fat milk has been uniformly mixed, the blend flows through pipe 32 to a homogenizer 34 of conventional type, wherein the blend is homogenized by breaking up the fat content into minute fat globules which are dispersed uniformly within the blend and are of such small size that they do not separate readily from the milk. After the milk is homogenized, if flows through pipe 36 to a branch 38 which leads to a pasteurizer (not shown) for final heating to pasteurizing temperature to result in the finished milk product.

Communicating with the pipe 36 is a bleed pipe 39 through which a small, regulated amount of the homogenized milk flowing through pipe 36 is diverted to the testing and monitoring apparatus 40 of the present invention. This testing apparatus 40 continuously measures the amount of butterfat in the homogenized milk drawn off through bleed pipe 39, and continuously compares the detected butterfat content information with a preselected standard butterfat signal to produce a digital control signal which is fed through electrical leads 42 and 44 to a valve interface 46 which continuously controls the operation of valve 20 in accordance with the control digital signals. The preselected standard butterfat signal corresponds to a milk blend having a precise selected butterfat content for the particular run of the processing system. For example, it may be desired to produce a blend having a 3.2% butterfat content, which is one of the standardized grades of milk sold commercially. The testing and monitoring apparatus 40 constantly measures the amount of butterfat in the homogenized milk sample fed through bleed pipe 39, and compares the fat percentage so measured to the preset desired percentage to be maintained. If the butterfat content measured falls below the pre-set percentage level, the corresponding digital control signals, fed to the digital valve interface 46, cause the latter to further close the valve 20 to such an extent that a larger amount of high-fat milk is fed through pipe 24 to mix with the low-fat milk, this larger amount of high-fat milk being sufficient to bring the butterfat content of the homogenized milk blend to the precise selected percentage. On the other hand, if the testing and monitoring system 40 senses that the butterfat content of the milk sample drawn off through bleed pipe 39 is above the pre-set selected level, the corresponding digital control signal fed to the valve interface 46 causes the valve 20 to open to a corresponding extent sufficient to decrease the flow of high-fat milk through the pipe 24 and divert a greater amount of high-fat milk to the outlet pipe 22.

Figure 2:
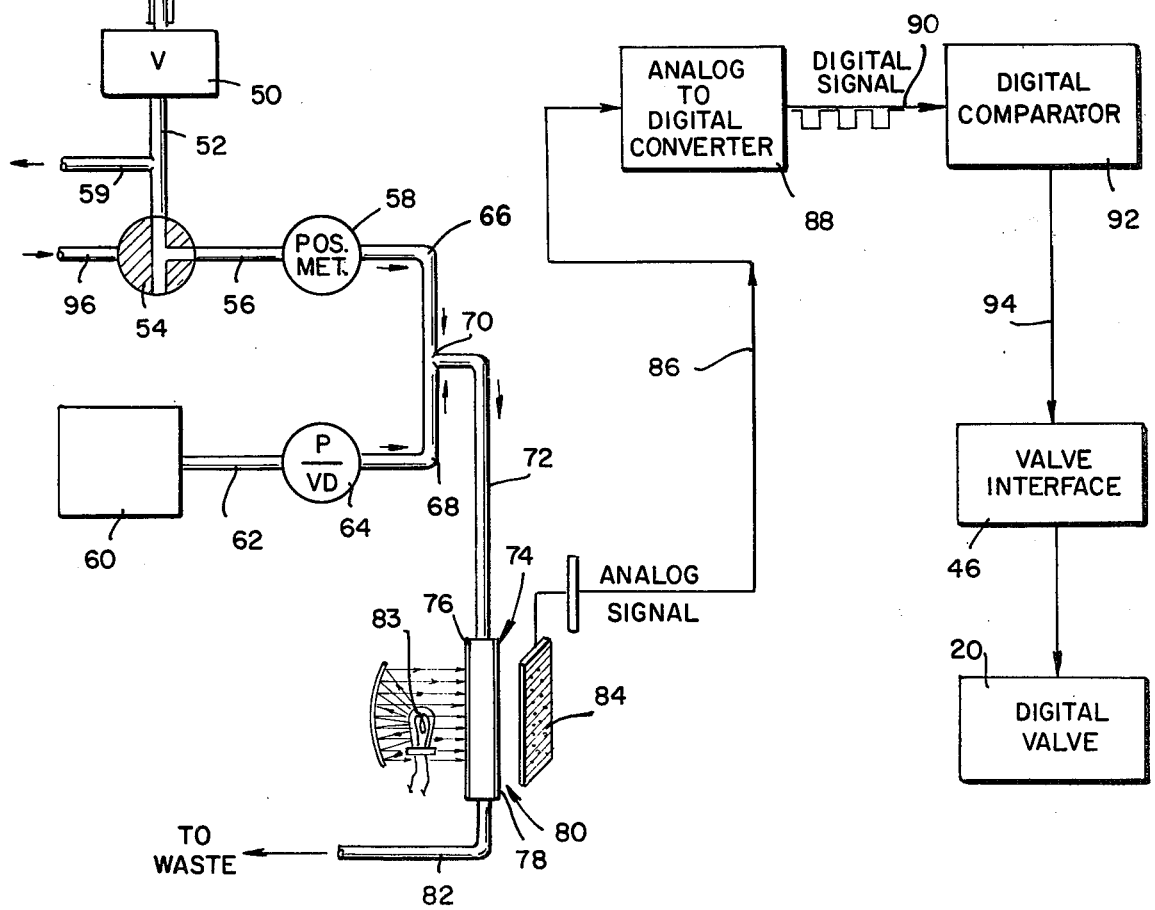
FIG. 2 is a diagrammatic view showing details of the monitoring and control system used in the processing system of FIG. 1.

FIG. 2 illustrates the monitoring and testing apparatus 40 in greater detail. In this view, it will be seen that the homogenized milk sample drawn from pipe 36 passes through bleed pipe 39 to a bleed valve 50 which limits the flow of the homogenized milk sample drawn off through bleed pipe 39. The milk sample flows from valve 50 through pipe 52 to a three-way valve 54 and then through pipe 56 to a positive metering pump 58. A drain pipe 59, communicating with pipe 52, drains off the surplus milk sample to waste. The pump 58 supplies a metered volumetric flow of the homogenized milk sample to mix with a metered amount of diluent detergent chelating agent fed from reservoir 60 and pipe 62 through a second positive metering pump 64. The chelating agent is preferably a disodium salt of ethylenediaminetetraacetic acid, distributed by Dow Chemical Company under the trademark Versene. This chelating agent destroys the casein micelles in the milk sample, preventing protein interference with the colorimetric testing thereof.

The two accurately metered streams of milk and chelating agent flow through respective pipes 66 and 68 to a junction point 70 at which they combine and pass through a pipe 72 in which they mix. The diluted milk sample is fed continuously through pipe 72 to a cuvette 74 in the form of a closed flat cell having transparent opposed walls formed by closely-spaced parallel glass plates 76 and 78. The diluted milk sample flowing continuously through the cuvette 74 has been subjected to homogenizing pressure supplied by the homogenizer 34 of the milk processing system of FIG. 1, and is colorimetrically tested continuously by a colorimeter 80, then passing through pipe 82 to a waste receptacle (not shown).

The colorimeter 80 includes a light source 83 adapted to direct a concentrated beam of light through the cuvette 74 to a photo-electric cell 84 which is adapted to produce an electrical analog signal corresponding to the amount of light detected thereby. It will be evident that the light passing through the cuvette 74 is partially blocked by the fat globules in the homogenized milk sample therein, so that the amount of light detected by the photocell 84 and the magnitude of the electrical analog signal produced thereby varies inversely with the butterfat content of the milk sample.

The analog signal produced by photocell 84 which corresponds to the measured butterfat content of the milk sample is applied via line 86 to an analog-to-digital converter 88 which converts the analog input signal to an equivalent digital output signal corresponding to the measured butterfat content in the milk sample, this measured butterfat digital signal being led via line 90 to the input of a digital comparator 92. Digital comparator 92 is operative to compare the measured butterfat digital with a precisely-set digital reference signal corresponding to the desired butterfat content in the homogenized milk to be produced and to produce a corrective digital output signal corresponding to the difference between the aforesaid measured butterfat digital signal and digital reference signal. The corrective digital signal is applied via line 94 to a valve interface 46 which includes a stepping motor connected to digital valve 20 and is adapted to open and close the latter in minute stepped intervals in accordance with the corrective digital signal applied to valve interface 46.

Thus, by way of example, comparator 92 may be calibrated so that the aforementioned digital reference signal corresponds to a 2.0% butterfat content in the homogenized milk to be produced. If the aforementioned measured butterfat digital signal corresponds to a butterfat content less that 2.0%, the digital corrective signal produced by comparator 92 and applied to interface 46 causes the latter to close digital valve 20 one step for each pulse in the digital corrective signal applied to interface 46 whereby digital valve 20 will proportionately increase the amount of high-fat milk to be fed into pipe 24 for mixing with the low-fat milk.

If the measured butterfat digital signal corresponds to a butterfat content greater than 2.0%, the digital corrective signal produced by comparator 92 and applied to interface 46 causes the latter to open digital valve 20 correspondingly so that a proportionately decreased amount of high-fat milk is fed into pipe 24 for mixing with the low-fat milk.

If the measured butterfat digital signal is equal to the digital reference signal which corresponds to a 2.0% butterfat content, there will be no output corrective signal applied to interface 46 and the respective amounts of high-fat milk being fed into pipes 24 and 22 respectively will remain unchanged.

The monitoring and testing apparatus 40 also contains means for the accurate calibration of the pre-set reference signal in comparator 92. Referring to FIG. 2, it will be seen that an inlet pipe 96 communicates with the valve 54 upstream of the positive metering pump 58. The valve 54 has a first operative position, shown in FIG. 2, in which the pipe 52, supplying a continuous sample of homogenized milk, is in communication with the pipe 56 and metering pump 58, and the pipe 96 is blocked off. The valve 54 also has a second operative position in which the pipe 52 is blocked off and the inlet pipe 96 is in communication with the pipe 56 and metering pump 58. For calibration of the comparator 92, the valve 54 is manually brought to its aforementioned second operative position, and a known homogenized milk sample is introduced through the inlet pipe 96. This known milk sample has been previously tested, as by chemical methods, and has been determined to contain the required percentage of butterfat, for example a butterfat content of 2.0%. This known sample is mixed with the chelating agent supplied through pipe 68 by metering pump 64, and as the known sample mixture is fed through the colorimeter 80, the pre-set value of the comparator 92 is adjusted until it is equal to the digital signal received from the colorimeter and no corrective signal pulses are transmitted to the valve interface 46. Such calibration is required only once each day in order to conform to changes in homogenization pressure and therefore variations in the size of fat globules in the homogenized milk.

Reference is now made to FIG. 3 which is a functional block diagram of the closed-loop monitoring and control apparatus 40 which is operative to control the butterfat content (BF%) of the homogenized milk to be produced by controllably and continuously throttling the high-fat milk flow into pipe 24 by means of digital valve 20 as the high fat milk flow continuously blends with the constant flow of low-fat milk from pipe 16. As previously indicated, digital valve 20 which is digitally driven by means of a stepping motor (not shown) incorporated in interface 46 is operative to open or close one step for each pulse in the corrective digital signal applied to interface 46. In a typical example, 3000 pulses will run digital valve 20 from a fully open to a fully closed condition. Accordingly, a controlled number of pulses in the corrective digital signal applied to interface. 46 will cause a corresponding change in the flow of high-fat milk to be blended with the milk which, in turn, will correspondingly vary the BF% in the homogenized milk end product of the present system.

Assuming that a 0 to 5.0% BF% operative range for the system is desired, this range may be divided digitally into 5000 equal discrete steps which correspond to the 3000 steps in the range of digital valve 20. In the operation of monitoring and control apparatus of FIG. 3, a pre-determined set point corresponding to the preselected desired BF% level is set into a first digital register A (REG A) and is compared with the contents of a second digital register B (REG B) which reflects the BF% to four significant figures. The difference, if any, in the values of REG A and REG B will cause a corresponding pulse train to change the contents of REG B while simultaneously stepping the opening of digital valve 20. Thus, REG B will count up or down, depending on the polarity of the difference between the instantaneous contents of REG A and REG B, until the contents of REG A equal that of REG B, at which time the corrective pulse train fed to REG B and the corrective pulse train fed to interface 46 ceases and will remain null until comparator 92 detects a difference between the operating point and the set point.

Thus, by way of example, every 60 seconds the contents of REG B is updated to correspond to the measured BF% of the homogenized milk end product. Assume, for example, that the contents of REG A is 3000 units while the operating point of REG B is 2950 units. Comparator 92 will detect this difference between REG A and REG B and in conjunction with the control logic circuit 98 will allow a pulse train 100 to be gated out of the control logic circuit 78 to be fed simultaneously to valve interface 46 and REG B. As REG B counts up fifty units corresponding to fifty pulses, a proportional number of corrective stepping pulses are applied to digital valve 20 via interface 46. When REG B thus reaches the 3,000 unit level, comparator 92 will signal control logic circuitry 98 to terminate the pulse train to REG B and interface 46.

Referring to FIG. 3, the magnitude of the measured BF% analog signal produced by photocell 84 is directly proportional to the concentration of the light impinging thereon which in turn is logarithmically related to the BF% in the milk sample in cuvette 74. The measured BF% analog signal is applied via line 102 to signal conditioning circuit 104 where the analog signal is continuously amplified and linearized by circuit 104 which may comprise integrated circuit operational amplifiers (I.C. Op-amps) and integrated circuit linearization modules (not shown) to produce a 0-5 VDC signal corresponding to the 0-5.0% BF range. The 0-5 VDC signal is applied via line 106 to A/D converter 108 which is operative to convert the continuous analog input to a digital pulse train 110 (which are TTL compatible) at its output line 112 having a number of pulses L directly proportional to the measured BF%. Thus, for example, each pulse in the pulse train 110 may correspond to 0.001% measured BF content. The gating signal, i.e. start and stop signals for generation of pulse train 110 is provided by control logic circuit 98, while the start signal may be given typically at 30, 60, 90 or 120 second intervals.

Pulse train 110 is led via line 112 to counter 114 which is a low stage decimal counter operative to produce a four digit BCD code at its output line 116 and which may typically comprise a TTL 7490 circuit. Thus, counter 114 is operative to count the number of pulses L in pulse train 110 and produce an output at line 116 in parallel BCD format in four significant figures which corresponds to the measured BF%. This output amounts to sixteen bits of digital information. The reset signal for resetting counter 114 is provided by control logic circuit 98 via line 118.

The aforementioned sixteen bit output of counter 114 is fed via line 116 to buffer register 120 which stores said sixteen bit information between analog to digital conversions by connector 108. Four stage buffer register 120 is operative to produce a four digit output in BCD code at its output line 122 and may comprise a TTL 74175 circuit. Buffer register 120 is loaded on command by means of a command signal provided by control logic circuit 98 via line 124 immediately after the aforementioned analog-to-digital conversion is completed. The output of buffer register 120 is available to an LED display 126 via line 128 and to a strip chart recorder 130 via line 132 for displaying the measured BF%.

The output of buffer register 120 is applied via line 122 to REG B which include a parallel load register and an up/down counter and may typically comprise a TTL 74190. On command from control logic circuit 98, by the application thereto of pulse train signal 140 via lead 142, the four-digit information output from buffer register 120 on line 122 is loaded into REG B and may be counted up or down depending upon the count direction control signal applied to REG B via line 150. The output of REG B is applied via line 146 to comparator 92 which may typically comprise a TTL 7485 circuit.

The desired BF% level is set by thumb wheel switch 134 which produces a desired BF% level output signal in three digit parallel BCD form at its output line 136 which is applied to REG A. REG A which may typically comprise a TTL 74L98 produces a four-digit output signal corresponding to the selected (i.e. desired) BF% which is applied via line 138 to comparator 92.

Comparator 92 is operative to continuously compare the sixteen bit information input from REG A and the sixteen bit information from REG B at appropriate intervals (e.g. 30, 60, 90 or 120 second intervals) and to indicate at its respective output lines 148 and 150 if the contents of REG B is less than or greater than the contents of REG A. If the contents of REG B is equal to that of REG A, there will be no output signal on either of output lines 148 and 150.

Control logic circuit 98 comprises timing generators, pulse generators, gating logic, load and reset logic circuits (not shown) and is operative to feed pulse train 100 on line 154 as well as open valve and close valve direction signals on line 156 and 158 respectively which cycles a stepping motor (not shown) to incrementally open and close digital valve 20. Control logic circuit 98 is operative when it receives an A < B or A > B signal via lines 148 and 150 respectively to gate pulse train 140 which is applied to REG B and pulse train 100 which is applied to valve interface 46, these pulse trains being so applied until the contents of REG B equal that of REG A.

Although the invention has been described with reference to a particular embodiment thereof, it is to be understood that such embodiment is merely illustrative of the application of the principles of the invention. Numerous modifications may be made therein and other arrangements may be devised without departing from the spirit and scope of the invention.

What is claimed is:

1. In a milk processing system within a closed loop milk standardization line wherein heat-treated milk is initially separated into high-fat and low-fat milk with the high fat milk being fed through a first high-fat line and the low-fat milk being fed through a separate second milk line to a junction line at which selected proportions of said high-fat and low-fat milk combine and mix as a reconstituted milk blend which is fed to a homogenizer and then to an outlet line,
   a monitoring and closed-loop control apparatus for measuring and controlling the butterfat content of the reconstituted homogenized milk blend,
   said monitoring and control apparatus comprising a digitally-controlled modulator valve located in said high-fat line and being operable to selectively restrict and enlarge the valve port thereof to vary the volume of high-fat milk flowing through said high-fat line to said junction line,
   monitoring means for continuously measuring the butterfat content of a continuously flowing sample of the homogenized milk blend drawn from said outlet line at a point downstream of said homogenizer and under pressure of said homogenizer, and for providing an electrical analog signal corresponding to the measured butterfat content of said sample,
   converter means for converting said analog signal to an equivalent measured butterfat digital signal,
   comparator means for comparing said measured butterfat digital signal to a pre-set digital reference signal and for producing a corrective digital signal corresponding to the difference between said measured butterfat digital signal and said digital reference signal, and
   a valve interface connected to said comparator means for receiving said corrective digital signal therefrom, and operable in response thereto to open and close said modulator valve by stepped increments corresponding to the corrective digital signal produced by said comparator means.

2. A monitoring and control apparatus according to claim 1 in which said modulator valve is a by-pass valve which also communicates with a high-fat milk outlet line, said modulator valve being operable to direct a portion of the high-fat milk flowing through said high-fat line from said separator to said junction line, and the remainder of said high-fat milk to said high-fat milk outlet line.

3. A monitoring and control system according to claim 1 in which said monitoring means includes a colorimeter comprising a cuvette, a light source for directing a beam of light through said cuvette, and a photoelectric cell positioned to receive said beam of light passing through said cuvette and to produce said electrical analog signal in accordance with the intensity of the light beam passing through said cuvette.

4. A monitoring and control system according to claim 3 in which said monitoring means also includes a bleed line connected to said outlet line for drawing said continuously flowing sample of homogenized milk blend therefrom, a supply line communicating with said bleed line for feeding said milk blend sample to said cuvette, and means for mixing a selectively metered flow of chelating agent to mix with said milk blend sample before the latter is fed to said cuvette.

5. A monitoring and control system according to claim 4 in which said monitoring means also includes a milk blend sample line communicating with said bleed line, a positive metering pump in said milk blend sample line, a source of chelating agent, a chelating agent line connected to said source of chelating agent, a positive metering pump in said chelating agent line, said milk blend sample line and chelating agent line communicating with each other at said supply line for feeding to said supply line a proportioned mixture of said milk blend sample and said chelating agent supplied by said positive metering pumps.

6. A monitoring and control system according to claim 5 in which said monitoring means also includes valve means located at the intersection of said bleed line with said milk blend sample line, and a known milk blend sample inlet line communicating with said valve means, said valve means being selectively movable between a first position in which said bleed line is in communication with said milk blend sample line and said known milk blend sample inlet line is blocked off, and a second position in which said known milk blend sample inlet line is in communication with said milk blend sample line and said bleed line is blocked off.

7. A monitoring and control system according to claim 1 wherein said comparator means comprises: a first digital register operative to produce a first digital signal corresponding to the desired butterfat content level in said reconstituted milk blend; a second digital register operative to produce a second digital signal corresponding to the measured butterfat content in said reconstituted milk blend; a comparator circuit operative to compare said first and second digital signals and to produce a direction control signal indicating which of said first and second digital signals is greater than the other applied to said second digital register, and a control logic circuit operative to produce a logic output pulse train applied having a number of pulses corresponding to the difference between said first and second digital signals applied to said second digital register to thereby count-up and count-down said second digital register in accordance with said direction control signal until said second digital signal is equal to said first digital signal.

8. A monitoring and control system according to claim 7 wherein said comparator means includes means for applying said direction control signal and said control logic circuit output pulse train to said valve interface.

9. A monitoring and control system according to claim 8 wherein said converter means comprises an analog-to-digital converter operative to produce a converter output pulse train having a number of pulses corresponding to the measured butterfat content in said sample and counter means operative to count up the number of pulses in said converter output pulse train.

10. A monitoring and control system according to claim 9 including a buffer register having its input connected to the output of said counter means and a first output connected to the input of said second register, and a second output adaptable for connection to means for visually displaying the digital output of said buffer register.

* * * * *